United States Patent [19]

Bergman

[11] 4,050,266
[45] Sept. 27, 1977

[54] DRIVE COUPLING
[75] Inventor: Lawrence A. Bergman, Euclid, Ohio
[73] Assignee: Lord Corporation, Erie, Pa.
[21] Appl. No.: 634,204
[22] Filed: Nov. 21, 1975
[51] Int. Cl.² .............................................. F16D 3/64
[52] U.S. Cl. ........................................ 64/14; 64/11 R; 64/13
[58] Field of Search ............. 64/14, 13, 27 NM, 11 R, 64/9

[56] References Cited
U.S. PATENT DOCUMENTS

| 2,208,314 | 7/1940 | Snyder | 64/14 |
|---|---|---|---|
| 2,213,277 | 9/1940 | Guy | 64/14 |
| 2,337,287 | 12/1943 | Williams | 64/14 |
| 3,120,745 | 2/1964 | Saurer | 64/14 |
| 3,257,826 | 6/1966 | Peterson | 64/14 |
| 3,438,221 | 4/1969 | Paulsen | 64/14 |

Primary Examiner—Samuel Scott
Assistant Examiner—Randall Heald
Attorney, Agent, or Firm—James W. Wright; Maurice R. Salada

[57] ABSTRACT

A drive coupling for interconnecting a pair of rotatable shafts includes a rigid spider that has four coplanar arms. Adjacent arms of the spider are oriented generally perpendicular to each other. A rigid element is disposed between each pair of adjacent arms of the spider. A body of elastomer is secured between each rigid element and each adjacent arm of the spider. One pair of diametrically opposed rigid elements can be connected to one of the rotatable shafts. The other pair of diametrically opposed rigid elements can be connected to the other rotatable shaft. When torque is being transmitted through the coupling, the bodies of elastomer are loaded primarily in compression. Angular misalignment of the shafts is accommodated primarily by shear deflection of the bodies of elastomer.

15 Claims, 5 Drawing Figures

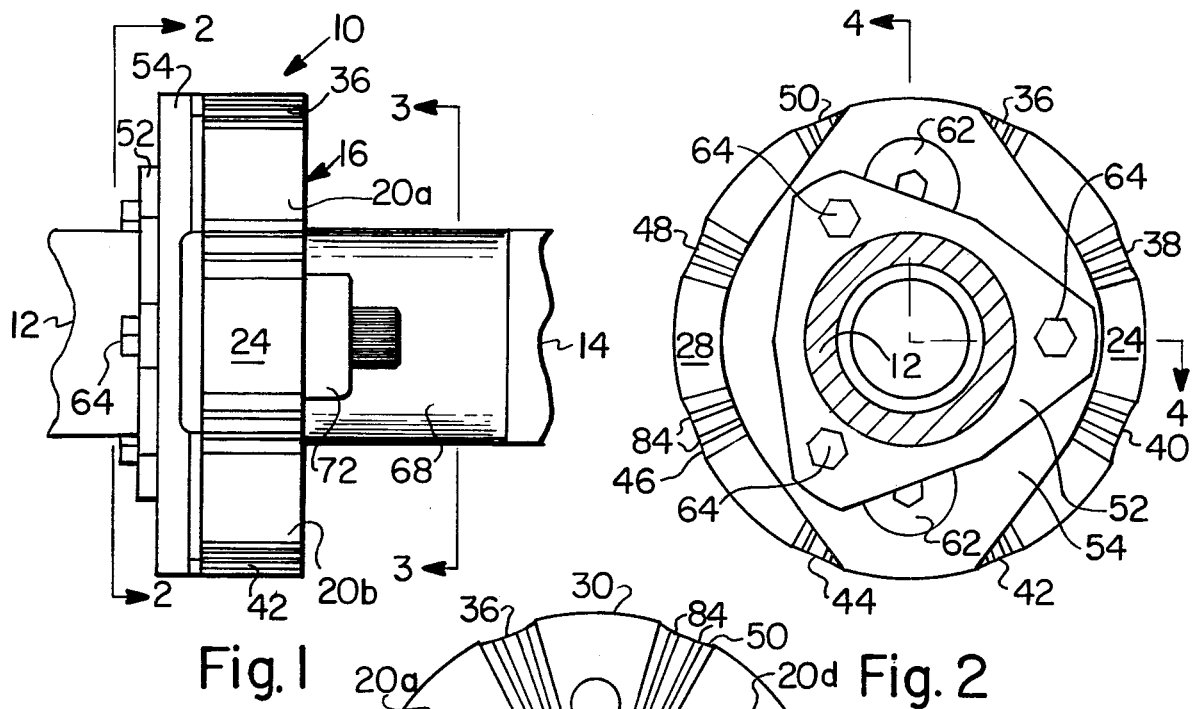
Fig. 1
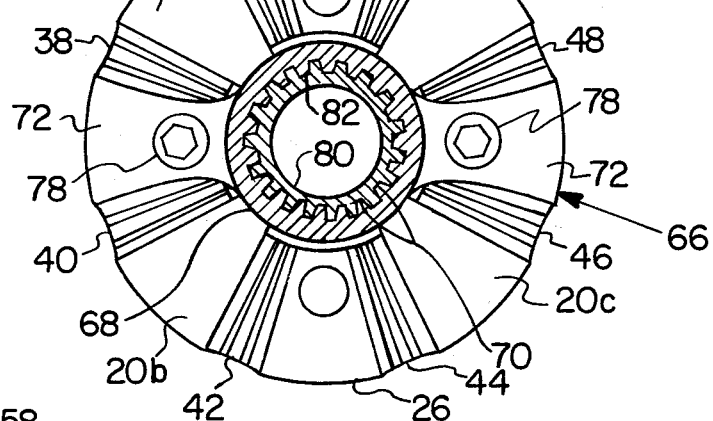
Fig. 3
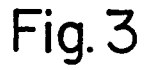
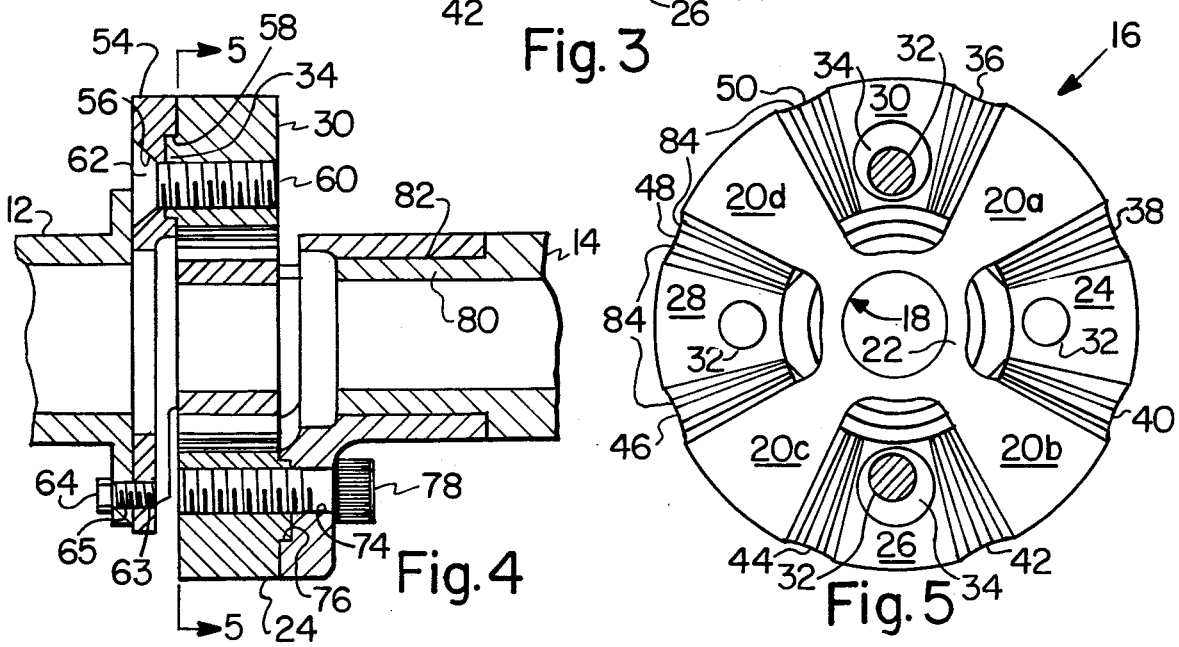

DRIVE COUPLING

BACKGROUND OF THE INVENTION

In any situation where power or torque is transmitted from one rotatable shaft to another, the shafts should ideally be in precise alignment. Proper alignment of the shafts reduces the performance requirements imposed on the coupling mechanism and optimizes the operation of the shafts and the machinery to which each shaft is connected. Although the two shafts may be precisely aligned when first installed, it is practically impossible to maintain such an alignment. This is particularly true when the shafts are incorporated in a moving structure such as a motor vehicle or an aircraft. Flexing of the body of the motor vehicle or aircraft may cause the mounting points or journals for the shafts to move relative to one another. Vibrations due to mass imbalances may cause the shafts to move out of alignment, just as may wearing of the journal bearings and wearing of the shafts themselves. In many installations, therefore, the drive coupling that connects the two shafts must be constructed to accommodate significant angular misalignments of the shafts.

A Hooke's or cardan type joint or coupling will permit the transmission of torque or power from one rotatable shaft to another despite angular misalignment of the shafts. Nonetheless, as larger and more powerful engines have been developed to turn shafts at higher rotational speeds, the loads to which shafts may be subjected at start-up of an engine or during operation, due to variations in rotational speed, have substantially increased. To protect drive shafts and the connections between shafts against such shock and vibration loads, many universal couplings of the Hooke's type incorporate resilient bushings. Thus, as is shown in Moulton et al. U.S. Pat. No. 2,975,621, a Hooke's type coupling may include a four-armed spider with an annular bushing of elastomeric material encircling each arm of the spider. Each pair of opposed arms of the spider is connected to a different shaft.

In a coupling such as shown in the Moulton et al. patent, the torque exerted by the driving shaft on the driven shaft produces a combination of compression and tension loads on each elastomeric bushing. Relative axial movement between the shafts (i.e., relative movement between the shafts along a common axis) also loads the bushings in a combination of compression and tension, while angular misalignment of the shafts loads the bushings primarily in torsional shear. Although the elastomeric bushings provide protection against shock and vibration loads, high torque-induced compression loads on the bushings produce large strains in the elastomer. These large strains, which appear as bulging of the elastomer, tend to attenuate the service life of the coupling through elastomer fatigue. The bulging can be reduced by introducing annular metal shims into the bushings, but such shims are expensive to manufacture and add significantly to the cost of the coupling. The coupling is also able to accommodate only limited axial movement between shafts that are coupled together. The addition of metal shims to the bushings of the coupling to improve the fatigue life of the bushings further limits the relative axial movement that can be accommodated.

Another construction for a resilient universal-type coupling is shown, for example, in Brownstein U.S. Pat. No. 2,157,996. In the Brownstein coupling, power is transmitted from the driving shaft to the driven shaft through pairs of disc-like members which have lugs that project from each member toward the other. The lugs on each disc-like member are circumferentially spaced apart so that the lugs of adjacent members mesh together. Bodies of elastomer are interposed between adjacent lugs to cushion shocks and vibrations and prevent their transmission from one shaft to the other. In such a coupling, the driving torque exerts compression loads on the bodies of elastomer. Relative axial movement between the shafts tends to cause shear loads, if any loads, on the bodies of elastomer. ("Anti-friction" strips interposed between each body of elastomer and adjacent metal parts may eliminate all loads on the bodies of elastomer.) Angular misalignment of the shafts exerts a variable combination of shear and "cocking" loads on the bodies of elastomer. The "cocking" loads represent a particular combination of shear and compression loads that results from tilting or cocking a flat surface relative to an elastomeric body bonded to the surface.

As compared to the coupling of the Moulton et al. patent, the Brownstein coupling offers the capability of accepting larger torque loads. The Brownstein coupling can also accommodate substantially greater relative axial movement between shafts, depending upon the clearances provided between the opposed disc-like members. On the other hand, the loads that result from angular misalignment of the coupled shafts will adversely affect the service life of the Brownstein coupling. In particular, the loads on each body of elastomer will vary cyclically in magnitude, direction and type (e.g., shear and cocking) during each revolution of the shafts. Such cyclical loads, particularly the cyclical compression loads that are a component of cocking loads, adversely affect the fatigue life of the elastomeric bodies, as compared to steady loads of similar magnitude.

The detrimental cyclical cocking loads found in the Brownstein coupling are common to couplings of similar construction, such as the coupling of Dossier U.S. Pat. No. 3,902,333. Nonetheless, Peterson U.S. Pat. No. 3,257,826 describes and illustrates a coupling which resembles the Brownstein coupling, but which avoids cyclical cocking loads on the elastomer in the coupling. In the Peterson coupling, each elastomeric body is a complex laminated structure of elastomer and metal. One portion of each laminated elastomeric body is, in effect, a ball-and-socket type joint. Angular misalignment of two shafts connected by such a coupling thus produces only torsional shear loads on the elastomeric bodies. Although the shear loads are cyclical, they are less detrimental to the fatigue life of the elastomeric bodies than cyclical cocking or compression loads. The complexity of the laminated structure in the Peterson coupling adds significantly to the weight and expense of the coupling. Thus, despite the improved fatigue life of the coupling, it is necessarily limited to installations in which the weight can be accommodated and the cost can be justified.

SUMMARY OF THE INVENTION

The present invention is directed to a universal-type drive coupling that incorporates bodies of elastomeric material and is constructed to accommodate angular misalignments of connected shafts primarily through cyclical shear loading of the bodies of elastomer. At the same time, the coupling will accommodate significantly more relative axial motion of the connected shafts than the coupling of the Moulton et al. patent and is less complicated and less expensive to make than the coupling of the previously mentioned Peterson patent. According to the invention, the drive coupling comprises a rigid member that has four coplanar, radially extending arms. Adjacent arms of the four-armed member are oriented perpendicular to each other. A rigid element is disposed between each arm of the four-armed member and the perpendicularly oriented arms. A body of elastomer is secured between each rigid element and each adjacent arm of the four-armed member. One pair of diametrically opposed rigid elements is adapted to be connected to one rotatable shaft. A second pair of diametrically opposed rigid elements is adapted to be connected to the other rotatable shaft. The only connection between the pairs of rigid elements is through the bodies of elastomer and the arms of the spider. Similarly, the only connection between the rigid elements and the spider is through the bodies of elastomer.

A drive coupling constructed as described above, in which only two diametrically opposed elements of the coupling are to be connected to each rotatable shaft, offers the opportunity to reduce or substantially eliminate cocking loads on the bodies of elastomer in the coupling. Such a reduction in the cocking loads is not possible where each shaft is connected to the coupling at more than two circumferentially spaced apart points, as is done in the couplings shown in the previously mentioned Dossier patent, for example. The reduction in cocking loads is assured by shaping and dimensioning each body of elastomer and the adjacent rigid parts of the coupling so that the elastomeric bodies have less resistance to relative parallel movement between adjacent rigid parts of the coupling than to relative movement of the adjacent rigid parts toward each other resulting from relative rotation of an adjacent rigid element about an axis that passes through the rigid element and through a diametrically opposed rigid element. In other words, each elastomeric body of the coupling should have a shear stiffness that is significantly less than the cocking stiffness of the body. Thus, as the coupling rotates while connecting angularly misaligned shafts, the bodies of elastomer in the coupling will deflect in shear rather than deflecting in response to cocking loads. The preferential shear deflection of the bodies of elastomer will effectively reduce, if not substantially eliminate, the cocking loads on the elastomer.

The desired relationship between the cocking stiffnesses and the shear stiffnesses of the bodies of elastomer may be achieved by embedding in each body of elastomer at least one shim of material that is substantially non-extensible relative to the elastomer. Each shim may be a flat plate, if minimum expense is desirable. Alternatively, each shim may be a plate that is thicker adjacent the outer circumference of the coupling and tapers radially toward the center of the coupling. Tapered shims will minimize variations in the torque-induced compression load on each body of elastomer. In a preferred embodiment of the invention, the four-armed member of the coupling is a spider with outwardly radiating arms. The rigid elements, the bodies of elastomer and the arms of the four-armed member are all preferably wedge-shaped and diminish in width or thickness from the outer circumference of the coupling radially toward the center of the coupling. To eliminate the possibility of tension loads in the bodies of elastomer while the coupling is rotating, the bodies of elastomer may be precompressed as the rigid elements are assembled into the spaces between the arms of the four-armed member.

BRIEF DESCRIPTION OF THE DRAWING

For a better understanding of the invention, reference may be made to the following description of an exemplary embodiment, taken in conjunction with the figures of the accompanying drawing, in which:

FIG. 1 is a side view of a coupling according to the present invention joining two rotatable shafts;

FIG. 2 is an end view of the coupling of FIG. 1, taken along line 2—2 of FIG. 1;

FIG. 3 is an end view of the coupling shown in FIG. 1, taken along line 3—3 of FIG. 1 and showing the end of the coupling opposite the end shown in FIG. 2;

FIG. 4 is a sectional view of the coupling shown in FIG. 1, taken along line 4—4 of FIG. 2; and FIG. 5 is an end view of the main resilient assembly of the coupling of FIG. 1, taken along line 5—5 of FIG. 4.

DESCRIPTION OF A PREFERRED EMBODIMENT

FIG. 1 of the drawing illustrates a resilient drive coupling 10 drivingly interconnecting a pair of rotatable shafts 12 and 14. As is best shown in FIG. 5, the main portion of the coupling 10 is a circular resilient assembly 16. The resilient assembly 16 includes a spider 18 fabricated of rigid material, such as steel or aluminum. The spider has four coplanar arms 20a–d that radiate from a central hub 22. Each of the arms 20a–d of the spider 18 is generally wedge-shaped and tapers in width or thickness from the outer circumference of the circular assembly 16 radially inward toward the center of the assembly. The central axes of adjacent arms 20 are oriented perpendicular to each other so that arms 20a and 20c and arms 20b and 20d are diametrically opposed and extend in opposite directions.

Interposed between adjacent arms 20 of the spider 18 are four wedge-shaped, rigid members or elements 24, 26, 28 and 30. Like the spider, the rigid members 24–30 may be solid bodies of steel or aluminum. Rigid member 24 is located between the arms 20a and 20b of the spider 18 and is spaced equally from both arms. The rigid member 26 is similarly located between the arms 20b and 20c, the rigid member 28 between the arms 20c and 20d, and the rigid member 30 between the arms 20d and 20a. Each rigid member 24–30 is identical to the others and diminishes in width or thickness from the outer circumference of the assembly 16 toward the center of the assembly. A threaded bore 32 is formed in each rigid member 24–30. Eccentrically surrounding the threaded bore 32 on one surface of each rigid member 24–30 is a raised circular lug 34 that serves an alignment function, as will be described hereinafter. The raised lugs 34 on opposed rigid members 24 and 28 are presented toward one end of the coupling 10 and the assembly 16, while the raised lugs 34 on opposed rigid members 26 and 30 are presented toward the other end of the coupling.

Between each rigid member 24–30 and each adjacent arm 20a–d of the spider 18 are bodies of elastomer 36, 38, 40, 42, 44, 46, 48 and 50, respectively. Each body of elastomer 36–50 is secured, preferably bonded, to the adjacent surfaces of a rigid member 24–30 and of an arm 20a–d of the spider 18. Due to the tapered shapes of the arms 20a–d of the spider 18 and the rigid members 24–30, the bodies of elastomer taper radially inwardly from the outer circumference of the assembly 16. As can be seen from FIG. 5, in particular, the outer circumference of the circular assembly 16 does not perfectly define a circle. The slightly irregular surface of the assembly 16 results from precompressing the bodies of elastomer 36–50. More specifically, the assembly 16 is initially fabricated with the rigid members 24–30 displaced radially outwardly from their normal positions shown in FIG. 5. Utilizing appropriate tooling that may be constructed by one skilled in the art, the rigid members 24–30 are forced radially inwardly prior to or upon connection of the coupling 10 to the shafts 12 and 14, as will be discussed. The radial movement of the rigid members 24–30 effectively precompresses the elastomeric bodies 36–50 so as to eliminate, or at least minimize, the possibility of tension loads on the bodies of elastomer during operation of the coupling 10.

As is best shown in FIG. 2, the resilient assembly 16 is secured to the rotatable shaft 12 through a triangular flange 52 formed at the end of the shaft 12 and an adapter plate 54 interposed between the flange 52 and the assembly 16. The rigid adapter plate 54 has an oblong shape and, as shown in FIG. 4, has a countersunk hole 56 passing through the plate adjacent each of its ends. On the surface of the plate 54 opposite the countersinks for the holes 56, a pair of circular recesses 58 eccentrically surround the holes 56. The recesses 58 are located and dimensioned to mate with the raised lugs 34 on the rigid members 26 and 30. When the rigid members 26 and 30 of the assembly are forced radially inwardly, the adapter plate 54 is placed against the rigid members 26 and 30 so that the recesses 58 in the plate mate with and receive the lugs 34 of the rigid members. A bolt 60 with a conical head 62 is inserted into each countersunk hole 56 in the adapter plate 54. The bolts are screwed into the threaded bores 32 of the rigid members 26 and 30 using an allen wrench, for example. When so connected to the rigid members 26 and 30, the adapter plate 54 holds the rigid members radially inwardly and in appropriate positions relative to each other.

In addition to the two countersunk holes 56, three smaller threaded bores 63 are also formed in the adapter plate 54. The bores 63 (one of which is shown in FIG. 4) are offset from the holes 56 and are arranged to line up with three openings 65 formed in the triangular flange 52. A lug bolt 64 with a hexagonal head is inserted into each of the openings 65 and is screwed into an aligned bore 63. The bolts 64 thus secure triangular flange 52 and the rotatable shaft 12 to the adapter plate 54 and the resilient assembly 16. As can be seen in FIG. 4, the central portion of the adapter plate 54 is raised away from the adjacent end surface of the resilient assembly 16 to allow for relative movement between the components of the assembly.

The resilient assembly 16 is secured to the rotatable shaft 14 through a connector 66, as shown in FIG. 3. The connector 66 comprises a hollow stub shaft 68 with longitudinally extending internal splines 70. A pair of diametrically opposed arms 72 project radially outwardly from the stub shaft 68 adjacent one end. A circular opening 74 is formed through each of the arms 72, as shown in FIG. 4. The surface of each arm 72 which is presented to the resilient assembly 16 has two circular recesses 76 that eccentrically surround the openings 74 in the arms 72. The recesses 76 are located and dimensioned to mate with and receive the raised lugs 34 on the rigid members 24 and 28, when the rigid members are displaced radially inwardly. A lug bolt 78 with an internal hexagonal wrenching head is inserted into each of the openings 74 and is screwed into the corresponding threaded bore 32 utilizing an allen wrench, for example. The resulting mating engagement between the raised lugs 34 on the surfaces of the rigid members 24 and 28 and the recesses 76 in the surfaces of the connector arms 72 maintains the rigid members 24 and 28 in proper relative and radial positions. The bolts 78 insure engagement between the recesses 76 and the lugs 34.

The rotatable shaft 14 has a reduced diameter extension 80 with a splined outer surface 82. The splined extension 80 is matingly received within the internally splined stub shaft 68. Rotational movement may thus be transmitted from the connector 66 to the shaft 14, or vice versa, through the mating splines of the stub shaft 68 and the shaft extension 80. As can be seen in FIG. 4, the end of the stub shaft 68 is raised away from the adjacent end surface of the resilient assembly 16 to allow for relative movement between the components of the assembly.

When assembled as shown in FIGS. 1 to 4 of the drawing, the drive coupling 10 can transmit rotational movement between the shaft 12 and the shaft 14. Rotational movement due to application of torque stresses alternate pairs of elastomeric bodies 36–50 in compression, depending upon the direction of rotation. For example, if the shaft 12 is rotated in a clock-wise direction, as viewed in FIG. 2, bodies of elastomer 36, 38, 44 and 46 are more heavily stressed in compression that the remaining bodies of elastomer. The precompression imposed on all of the bodies of elastomer 36–50, however, prevents tension loads on the bodies of elastomer 40, 42, 48 and 50, particularly when the coupling starts rotating. Relative axial movements between the shafts 12 and 14 load the bodies of elastomer 36–50 in shear. Such movements are permitted by the clearances between the adapter plate 54 and the resilient assembly 16 and between the connector 66 and the resilient assembly 16.

Angular misalignments between the shafts 12 and 14 preferably impose only shear loads on the bodies of elastomer 36–50 in planes oriented radially of the coupling 10. For example, if the left end of the shaft 12 were inclined downwardly, as viewed in FIG. 1, the rigid member 30 would be pulled to the left in FIG. 1, while the rigid member 26 would be pushed to the right in FIG. 1. Because each body of elastomer 36–50 has a greater resistance to cocking deflection than to shearing deflection, the movement of the rigid members 26 and 30 can be accommodated through shear deflection of the bodies of elastomer 36, 50, 42, and 44, with only a relatively insignificant load being exerted on the bodies of elastomer 38, 40, 46 and 48. As the shaft 12 rotates a quarter of a revolution in a clock-wise direction, as viewed in FIG. 2, and the rigid member 28 moves into a top dead center position, the angular misalignment of the shaft 12 relative to the shaft 14 appears to cause the member 28 to move to the right, as viewed in FIG. 1, and the rigid member 24 to move to the left. Actually, because the rigid members 24 and 28 are secured to the shaft 14, the members 24 and 28 do not move, in an absolute sense, except to rotate with the shaft 14. The rigid members 24 and 28 move relative to the remainder of the coupling 10, including the spider arms 20a–d, in the sense that the spider 18 shifts away from the plane in which members 24 and 28 lie and toward the plane in which rigid members 26 and 30 lie. In other words, the spider 18 moves away from or out of a plane that is generally perpendicular to the shaft 14 and toward or into a plane that is generally perpendicular to the shaft 12. Since the cocking stiffnesses of the bodies of elastomer 36-50 exceed their shear stiffnesses, the relative movement between the rigid members 24 and 28, on the one hand, and the spider arms 20a-d, on the other hand, is accommodated primarily through shear deflection of the bodies of elastomer 46, 48, 38 and 40. Due to the symmetrical orientation of the spider arms 20a-d and of the rigid members 24-30, relative movement between the spider arms and the rigid members occurs generally about the center of the coupling 10. In any rotational orientation of the coupling 10 between its quarter revolution positions, angular misalignment of the shafts will be accommodated primarily by a combination of shear deflections of all of the elastomeric bodies 36-50. Some cocking loads on the bodies of elastomer cannot be avoided despite the tendency of the elastomeric bodies to deflect in shear.

The torsional stiffness of the coupling 10 and the ratio of cocking stiffness to shear stiffness of the bodies of elastomer 36-50 can be significantly increased by embedding in each body of elastomer one or more shims or plates 84 of nonextensible material, such as steel. As is well known in the art, rigid laminae in a body of elastomeric material will increase the compression stiffness of the body of elastomer without significantly affecting its shear stiffness or resistance to shear loads. Since the cocking loads that may be imposed on the bodies of elastomer by the rigid members 24-30 during rotation of the flexible coupling 10, with angular misalignment of the shafts 12 and 14, represent a combination of shear and compression loads, the addition of the rigid laminae 84 will increase the "cocking" stiffnesses of the bodies of elastomer. The number of shims to be added to each body of elastomer will vary according to the increase that is desired in the cocking stiffness of the body of elastomer as originally dimensioned. The shims 84 should lie generally along radii of the circle defined by the outer circumference of the resilient assembly 16. The shims 84 may be wedge-shaped, as shown, or flat. Wedge-shaped shims are widest adjacent the outer circumference of the resilient assembly 16 and diminish in size toward the center of the assembly. Shims 84 that are wedge-shaped minimize the variations in compression induced strains from the radially outer surface of each body of elastomer to the radially inner surface of the body.

Proper operation of the coupling 10, whereby angular misalignment of the shafts 12 and 14 is accommodated primarily through shearing of the bodies of elastomer 36-50, depends not only upon a significantly high ratio of cocking stiffness to shear stiffness in each of the bodies of elastomer 36-50, but also upon the provision of only two diametrically opposed connecting points between each shaft and the resilient coupling assembly 16. The use of additional circumferentially spaced apart connecting points, as in the couplings of the previously mentioned Dossier patent, will effectively interfere with the effort to have most, if not substantially all, of the angular misalignment accommodated by shearing of the bodies of elastomer.

In addition to its capability to accommodate angular misalignments and relative axial movements between the two shafts 12 and 14, the coupling 10 will also accommodate axial misalignment or non-coaxial parallel orientation of the shafts. For example, if the shaft 12 were displaced, but not tilted, upwardly relative to the shaft 14, as viewed in FIG. 1, the motion would be accommodated primarily by deflection of elastomeric bodies 36, 42 44 and 50. Elastomeric bodies 36 and 40 would be loaded primarily in shear, while elastomeric bodies 42 and 44 would be loaded in a combination of shear and compression. The wedging action between the tapered rigid element 26 and the adjacent tapered arms 20b and 20c of the spider 18 causes the compression loads on the bodies of elastomer 32 and 34 and also limits the amount of axial misalignment that can be accommodated by the coupling 10. Larger axial misalignments or radial displacements between the shafts 12 and 14 can be accommodated by changing the tapered shape of the rigid elements 24-30 to a rectangular shape. Axial misalignments would then be accommodated solely by shear deflection of the bodies of elastomer, limited solely by the clearance between the radially inner edges of the rigid members and the hub 22 of the spider 18. Even the limitation imposed by the hub 22 of the spider 18 could be eliminated by rigidly mounting the arms 20a-d on a "hub" surrounding the assembly 16 and eliminating the hub 22 disposed within the assembly 16.

It will be understood that the embodiment described above is merely exemplary and that persons skilled in the art may make many variations and modifications without departing from the spirit and scope of the invention. For example, the particular structures for connecting the rigid members 24, 26, 28 and 30 to the shafts 12 and 14 may be varied in design to suit any particular purpose providing that only two circumferentially spaced apart conections at diametrically opposed locations are provided between each shaft and the resilient coupling assembly 16. All such modifications and variations are intended to be within the scope of the invention as defined in the appended claims.

What is claimed is:

1. A drive coupling adapted to connect first and second rotatable shafts comprising:
   a. a rigid member that has four coplanar radially extending arms, adjacent arms being oriented perpendicular to each other;
   b. a rigid element disposed between each arm of the four-armed member and the arms perpendicular to said arm; and
   c. a body of elastomer disposed between and secured to each rigid element and each adjacent arm of the four-armed member,
   a first pair of diametrically opposed rigid elements being adapted to be connected to the first rotatable shaft and a second pair of diametrically opposed rigid elements being adapted to be connected to the second rotatable shaft, each body of elastomer being (i) precompressed between a rigid element and an arm of the four-armed member and (ii) less resistant to relative parallel movement between a rigid element to which said body of elastomer is secured and an arm of the four-armed member to which said body of elastomer is secured resulting from rotation of said rigid element relative to said arm of the four-armed member about a point disposed between said rigid element and a diametrically opposed rigid element than to relative movement of said rigid element toward said arm of the four-armed member resulting from rotation of said rigid element relative to said arm of the four-armed member about an axis that passes through said rigid element and through said diametrically opposed rigid element.

2. A drive coupling, according to claim 1, wherein each body of elastomer has embedded in it at least one radially extending shim of material that is substantially nonextensible in comparison to said body of elastomer.

3. A drive coupling, according to claim 2, wherein each shim is thickest adjacent an outer circumference of the drive coupling and tapers radially toward the center of the coupling.

4. A drive coupling, according to claim 1, wherein the bodies of elastomer are bonded to said rigid elements and said arms of the four-armed member.

5. A drive coupling, according to claim 1, wherein said four-armed member is a spider.

6. A drive coupling, according to claim 1, wherein each rigid element is equally spaced between adjacent arms of the four-armed member.

7. A drive coupling, according to claim 1, wherein said first pair of diametrically opposed rigid elements is connected to said second pair of diametrically opposed rigid elements only through the bodies of elastomer and the arms of the four-armed member, the bodies of elastomer being the only connections between the rigid elements and the four-armed member.

8. A drive coupling, according to claim 1, also comprising means rigidly interconnecting the first pair of opposed rigid elements and means rigidly interconnecting the second pair of opposed rigid elements, said interconnecting means also maintaining the precompression of the bodies of elastomer.

9. A drive coupling, according to claim 1, wherein said point about which relative rotation between said rigid element and said arm of the four-armed member occurs is disposed generally midway between said rigid element and said diametrically opposed rigid element.

10. A drive coupling, according to claim 1, wherein each of the rigid elements, each of the arms of the four-armed member, and each of the bodies of elastomer is generally wedge-shaped with the larger end of said wedge shape being adjacent an outer circumference of the coupling and the smaller end of said wedge shape being radially closer to the center of the coupling.

11. A drive coupling adapted to connect first and second rotatable shafts comprising:
    a. a rigid spider that has four coplanar radially extending arms, adjacent arms being oriented perpendicular to each other;
    b. a rigid element disposed and equally spaced between each arm of the spider and the arms perpendicular to said arm; and
    c. a body of elastomer disposed between and bonded to each rigid element and each adjacent arm of the spider,
    each rigid element, each spider arm and each body of elastomer being generally wedge-shaped and tapering from an outer circumference of the coupling toward the center of the coupling, a first pair of diametrically opposed rigid elements being adapted to be connected to the first rotatable shaft and a second pair of diametrically opposed rigid elements being adapted to be connected to the second rotatable shaft, said first pair of diametrically opposed rigid elements being connected to said second pair of diametrically opposed rigid elements only through the bodies of elastomer and the arms of the spider, the bodies of elastomer being the only connections between the rigid elements and the spider, each body of elastomer being (i) precompressed between a rigid element and a spider arm and (ii) less resistant to relative parallel movement between a rigid element to which said body of elastomer is bonded and an arm of the spider to which said body of elastomer is bonded resulting from rotation of said rigid element relative to said arm of the spider about a point disposed generally midway between said rigid element and a diametrically opposed rigid element than to relative movement of said rigid element toward said arm of the spider resulting from rotation of said rigid element relative to said arm of the spider about an axis that passes through said rigid element and through said diametrically opposed rigid element.

12. A drive coupling, according to claim 11, wherein each body of elastomer has embedded in it at least one radially extending shim of material that is substantially nonextensible in comparison to said body of elastomer.

13. A drive coupling, according to claim 12, wherein each shim is thickest adjacent an outer circumference of the drive coupling and tapers radially toward the center of the coupling.

14. A drive coupling, according to claim 11, also comprising means rigidly interconnecting the first pair of diametrically opposed rigid elements and means rigidly interconnecting the second pair of diametrically opposed rigid elements, said interconnecting means also maintaining the precompression of the bodies of elastomer.

15. A drive coupling adapted to connect first and second rotatable shifts comprising:
    a. a rigid member that has four coplanar radially extending arms, adjacent arms being oriented perpendicular to each other;
    b. a rigid element disposed between each arm of the four-armed member and the arms perpendicular to said arm; and
    c. a body of elastomer disposed between and secured to each rigid element and each adjacent arm of the four-armed member,
    a first pair of diametrically opposed rigid elements being adapted to be connected to the first rotatable shaft and a second pair of diametrically opposed rigid elements being adapted to be connected to the second rotatable shaft, each body of elastomer being less resistant to relative parallel movement between a rigid element to which said body of elastomer is secured and an arm of the four-armed member to which said body of elastomer is secured resulting from rotation of said rigid element relative to said arm of the four-armed member about a point disposed between said rigid element and a diametrically opposed rigid element than to relative movement of said rigid element toward said arm of the four-armed member resulting from rotation of said rigid element relative to said arm of the four-armed member about an axis that passes through said rigid element and through said diametrically opposed rigid element.

* * * * *